United States Patent
Persson

(10) Patent No.: US 6,973,909 B2
(45) Date of Patent: Dec. 13, 2005

(54) SYSTEM AND METHOD FOR DETECTING LUBRICANT IN THE FUEL OF AN INTERNAL COMBUSTION ENGINE

(76) Inventor: Leif Persson, 5342 Carnegie Loop, Livermore, CA (US) 94550

( * ) Notice: Subject to any disclaimer, the term of this patent is extended or adjusted under 35 U.S.C. 154(b) by 0 days.

(21) Appl. No.: 10/510,510

(22) PCT Filed: Apr. 8, 2003

(86) PCT No.: PCT/SE03/00563

§ 371 (c)(1),
(2), (4) Date: Nov. 15, 2004

(87) PCT Pub. No.: WO03/087546

PCT Pub. Date: Oct. 23, 2003

(65) Prior Publication Data

US 2005/0150479 A1    Jul. 14, 2005

(30) Foreign Application Priority Data

Apr. 9, 2002   (SE) .................................... 0201066

(51) Int. Cl.[7] ........................ F02D 41/22; G01M 15/00
(52) U.S. Cl. .................. 123/196 S; 123/1 A; 73/118.1
(58) Field of Search ..................... 123/196 R, 196 S, 123/73 AD, 1 A; 184/6.1, 6.4, 108; 73/116, 73/118.1

(56) References Cited

U.S. PATENT DOCUMENTS

| | | | |
|---|---|---|---|
| 5,036,699 A | * | 8/1991 | Fikentscher et al. ....... 73/61.41 |
| 5,076,397 A | | 12/1991 | Yamada |
| 5,274,335 A | | 12/1993 | Wang et al. |

* cited by examiner

*Primary Examiner*—Andrew M. Dolinar
*Assistant Examiner*—Katrina Harris
(74) *Attorney, Agent, or Firm*—Pearne & Gordon LLP

(57) ABSTRACT

A system for an internal combustion engine (10) arranged for being powered with a fuel mixed with a lubricant, which system includes:—a detector (16) arranged for detecting the presence of a given additive in the lubricant mixed fuel—an electronic module (24) arranged for comparing the detected presence of the additive with a predetermined threshold value, and designed so that if the lubricant is not mixed in the fuel, or has been mixed in the fuel in an amount lower than a through the additive against the threshold value correlated amount, by means of an indicator (30) indicate that a lack of lubricant is at hand in the fuel and/or by means of a connection (26) to an ignition or injection system (11) for the engine (10) prevent or modify the operation of the internal combustion engine if said lack of lubricant is at hand in the fuel. The invention also refers to the method of how the system operates.

12 Claims, 1 Drawing Sheet

SYSTEM AND METHOD FOR DETECTING LUBRICANT IN THE FUEL OF AN INTERNAL COMBUSTION ENGINE

This application claims the benefit of International Application Number PCT/SE03/00563, which was published in English on Oct. 23, 2003.

TECHNICAL FIELD

The invention refers to a system and a method for an internal combustion engine arranged to be operating on a mixture of fuel and lubricant, i.e. typically a two-cycle engine.

BACKGROUND OF THE INVENTION

Most two-cycle engines and even some recently developed four-cycle engines require a continuous supply of lubricant. In such internal combustion engines the lubricant is supplied continuously either by pumping small amounts of for example oil through a separate lubrication system to the vital parts of the engine or by mixing the lubricant in the fuel at the time of refueling the fuel tank for said engine.

Different systems have previously been developed to avoid that, for example two-cycle engines, sustain damage due to that the necessary lubricant for the engine is not present. These systems are typically designed as part of a separate lubrication system, including a separate lubricant tank, whereas the presence of lubricant is indicated by the system, e.g. by means of a float device etc. connected to a gauge or a indicator lamp or directly to the ignition system for the engine.

In some engine applications it has proven to be impractical to use a separate lubricant tank and/or a pump system to continuously supply the lubricant. Examples are hand held small two-cycle engines, used among others in chain saws, grass trimmers and cut-off saws, that are used in varying running conditions and thus the separate lubrication systems have not been successfully applied. Due to the impracticality of the separate lubrication systems the lubricant is usually added/mixed to the fuel before the fuel is filled into the fuel tank of the engine.

One problem of supplying the lubricant to the engine through supply together with the fuel is to detect if a lubricant is present in the fuel or not. It is however common that a lubricant that is intended to be mixed in fuel is distinctly colored by, for example, a blue, green or red die. When said colored lubricant is mixed in the fuel the mixture of lubricant and fuel will also be fairly strong colored and can thus visually be inspected in for example a transparent vessel. Such an inspection is however dependent on that the operator is aware of the problem and that he actively takes the measures to check if lubricant has been added to the fuel. There is therefore nothing that prevents an engine from being operated even though an improper mixture of fuel/lubricant is used.

The result of operating an internal combustion engine that requires a continuous supply of lubricant without lubrication is usually significant engine damage before the operator gets any indication of that the lubricant is not present.

SUMMARY OF THE INVENTION

It is the general object of the invention to provide a system and method that prevents or at least minimizes the problems outlined above.

More specifically the invention intends to present a system and a method that gives an indication/warning and/or prevents or changes the operation of an internal combustion engine whenever no or an insufficient amount of lubricant is present in the fuel.

These and other objectives are achieved with the system and method of the invention as presented in the patent claims The invention idea is based on an automatic detection of the presence of lubricant in the fuel, that the detected amount of lubricant is compared to a predetermined threshold amount and that an indication is given when a lack of lubricant is detected, i.e. when the threshold amount is not reached and/or that the engine operation is prevented or altered when a lack of lubricant is at hand. Change of the operation of the engine is preferably arranged so that only an idle speed is allowed if a lack of lubricant is detected in the fuel. Normally, engine damage will not occur if the engine operates at an idle speed or at a low RPM since residual lubricant normally remains from previous operation and is not washed away directly.

It has however been established that it is difficult to directly detect if a proper amount of lubricant is present in the fuel/lubricant mix, thus according to the invention an additive is used that enables detection. It is therefore the presence of this additive that is detected and the pre determined threshold amounts is for the presence of this additive. The presence of lubricant is however directly correlated to the presence of the additive since the additive is mixed into the fuel in an amount in direct proportion to the amount of lubricant. Preferably the additive is mixed directly into the lubricant already before the sale of the lubricant but it is also feasible to mix the additive and lubricant separately in the fuel.

The threshold amount can preferably be adjustable whereas it is calculated and adjusted with consideration to the type of additive and limits of the mixing ratio between the fuel, lubricant and additive. The threshold amount is thus dependent on how much additive that is mixed into the mix of lubricant and fuel and what the lower limit for the mixing ratio between lubricant and fuel should be—typically minimum 0.5%, preferably minimum of 1% lubricant in the fuel. In one embodiment of the invention an upper threshold amount could be utilized, correlating to an upper limit for the mixing ratio between the lubricant and the fuel, typically maximum 0.5% or preferably maximum 1% lubricant in the oil. When this upper threshold amount is exceeded the system can indicate this in a different way from the case when the lower limit is reached, whereas however normally the engine operation does not need to be actively prevented or altered. At given limits and a known additive in a known concentration the threshold amount can be fixed i.e. does not need to be adjustable.

In a first embodiment of the invention the additive used is changing, preferably increasing, an electrical conductivity or capacitance of the mixture of fuel and lubricant, whereas the detection of the additive in the lubricant/fuel mixed fuel is arranged in terms of a conductivity or capacitance and said threshold amount is a threshold amount in terms of conductivity or capacitance.

In accordance to a second embodiment of the invention said additive is an additive that changes an optical property of the mixture of fuel and lubricant. The detection of the presence of the additive in the lubricant mixed fuel, is arranged in terms of this optical property and said threshold amount is a threshold amount expressed in terms of this optical property. Preferably an optic-electronic detector is used for the detection of the additive, such as a light emitting diode (LED) and a photo transistor, whereas the additive is a dye adapted to absorb light of the same wavelength as emitted by the LED. It is however also possible to use any other source of light and light detector, i.e. in any wavelength or spectrum whereas the additive is adapted for the selected wavelength or spectrum.

DESCRIPTION OF THE DRAWING

The invention will be described in more detail in the following with reference to FIG. 1 that is schematically illustrating a system according to the preferred second embodiment of the invention.

Item number 10 and 11 in the system in FIG. 1 symbolize a two-cycle internal combustion engine and its ignition system. A fuel tank 12 is connected to the engine 10 with a fuel line 14. The fuel tank is filled with a fuel, normally gasoline, together with a lubricant, normally oil, and an additive to be detected, in predetermined proportions. The additive is in this embodiment of the invention a colorant (dye) that have light blocking characteristics in a selected wave length spectrum of for example 400 to 450 nanometer (nm) i.e. blue visible light. Even other dyes that have light blocking characteristics in any other wave length spectrum, for example the infrared spectrum at about 900 nm could be used.

Figure 1:
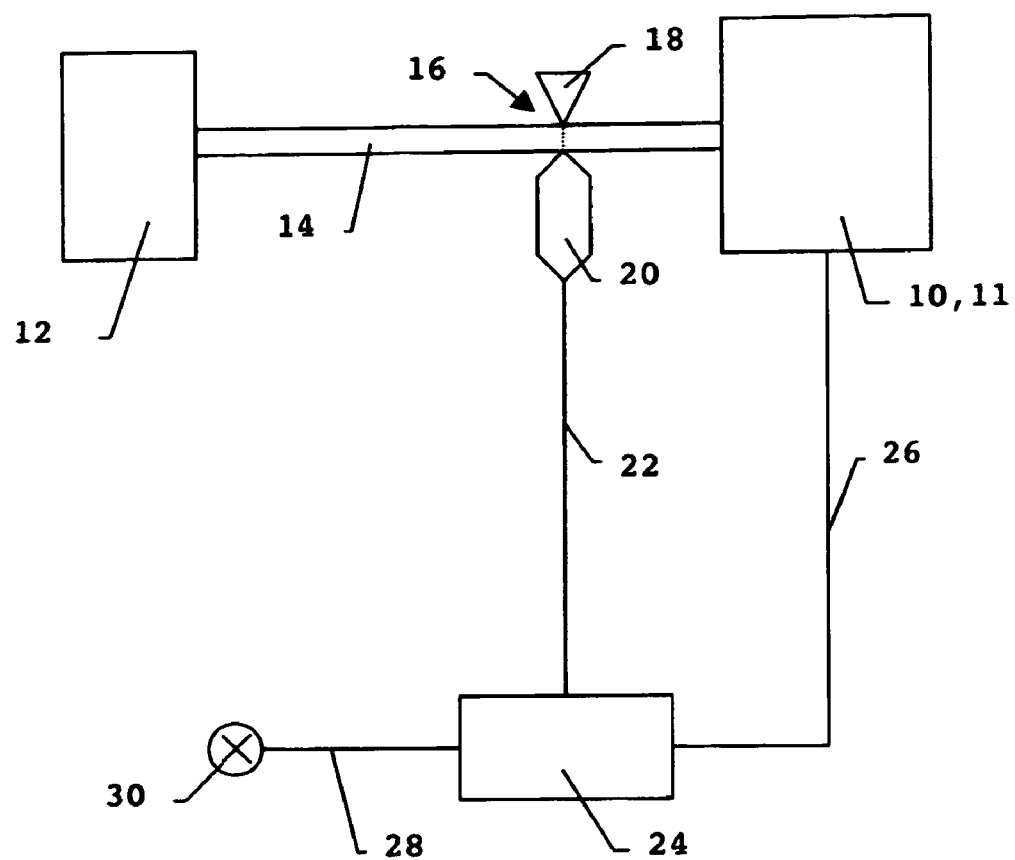

The fuel line 14 has a transparent part at a detector 16. The detector 16 includes in this preferred embodiment a light emitting diode(LED) 18 and a photo transistor 20. The LED 18 is selected and adapted to emit light within the same wave length spectrum as the spectrum at which the dye has light blocking properties. When a mixture of fuel lubricant and additive, i.e. dye, in the fuel line 14 is passing at the detector 16 the light is blocked or weakened from the LED due to the dye. The phototransistor 20 registers this blocking or weakening of the light and sends a signal through the electric wire 22, to a electronic module 24. In the electronic module the signal is compared to a predetermined threshold value for the dye concentration and thus an indirect detection is made if the lubricant concentration is adequate, which it is if the threshold value is exceeded.

If the threshold value is exceeded the electronic module indicates that this condition is fulfilled and the engine 10 is allowed to operate as normal. On the other hand if the signal indicates that the value falls below the threshold value, i.e. that a sufficient blocking or weakening of the light from the LED 18 is not registered, the electronic module 24 sends instructions to the engines 10 ignition system 11 through a connection 26 to interrupt the ignition for the engine 10 or to only let the ignition function properly at a low speed or at the idle speed. This means that the ignition will turn on and off dependent of the speed of the engine, which gives a very specific operation of the engine. This also means that the operator would not mistake the situation with any other failures such as a faulty ignition. As an alternative or in combination with the electronic module 24 can send a signal to an indicator 30, for example a light or sound indicator, that is activated whereas the operator is made aware of the situation of a lack of lubrication. According to an aspect of the invention one could also imagine that the indicator 30 indicates the current concentration of lubricant on a display and even the amount needed to be filled in the fuel tank 12.

It is realized that the detector 16 and the threshold value can be adjusted to the colorants that according to the above already exists in some lubricants/oils today, with respect to the type of colorant ( i.e. what wavelength spectrum that they block) as well as its concentration in the lubricant. As an alternative the detector 16 and its threshold value is adjusted to a dye or additive specifically developed for the purpose. Preferably such dye or additive would be mixed into the lubricant preferably already before the sale of the lubricant, but it is also possible to mix the dye or additive and lubricant separately into the fuel. With suitably selected dyes, for example one that blocks the light in the wavelength spectrum of 400 to 450 nm it would be enough with as little as 2%, preferably less than 1%, and even more preferred less than 0.5% colorant in the lubricant. Not limited to such examples of colorants are solvent based, oil soluble dyes including one or more azo colorants. In connection with the development of the invention among others Liquid Yellow DRHF, Yellow GRHF, Yellow F2HF that are manufactured by United Color Manufacturing, were used with success. These colorants include a mixture of monoazo and diazo colorants and all have strong light blocking characteristics in the wavelengths of 400 to 450 nm.

In the first embodiment of the invention the system is the same as that illustrated in FIG. 1, with the exception that the detector 16 is instead comprising two electrodes 18, 20 that are designed to detect electrical conductivity in the lubricant mixed fuel. The electrodes are then in direct contact with the lubricant mixed fuel whereas the transparent part of the fuel line 14 is not needed. The additive in this case could consist of a component, for example an alcohol, that changes, preferably increases, the electrical conductivity or capacitance in the mixture of lubricant and fuel, whereas the threshold value is expressed in terms of electrical conductivity or capacitance. Pure gasoline has a very low electrical conductivity or capacitance and this is also the case for conventional lubricants, thus an additive would be required for the detection.

According to one aspect of the invention the system could be designed so necessary equipment such as detector, electronic module, etc. could be adopted to an already existing engine.

EXAMPLE

A cut-off saw was equipped with a system according to the invention as follows.

A measuring bridge comprising a blue LED with a wave length of 430 nm and a conventional phototransistor were placed on opposite sides of a clear plastic tube with an inside diameter of approximately 6 mm. The plastic tube was connected to the fuel line of the engine. The measuring bridge was connected to and powered by an electronic module.

The power source for the electronic module and the LED consisted of a simple inductive coil that was installed by the flywheel (with permanent magnets) on a gasoline powered cut-off saw.

The ignition system of the cut-off saw has a simple grounding wire (kill switch wire) that is normally connected to a simple switch. When the kill switch wire is grounded at the switch by manually switching the same, the ignition for the engine is shut off. On the prototype the ground wire for the ignition was connected to the electronic module. The electronic module was then connected to the switch. For safety reasons it should still be possible to switch off the ignition to the engine regardless of if the electronic module works or not.

The electronic module used on the prototype had the following functions included:

1. The inductive coil at the flywheel is generating a low alternating current of approximately 12 to 30 volts dependent on the speed of the engine. The current is rectified and modulated to power other functions of the electronic circuit and provides the energy for the LED.

2. If the light from the LED does not reach the phototransistor at a specific intensity (inverted threshold value) i.e. the light is blocked by the colorant mixed in the oil/fuel mixture, the engine will operate normally and it can also be shut off with the switch in a normal fashion.

If the light from the LED reaches the phototransistor with a higher intensity (exceeds the inverted threshold value or in other words is lower than the threshold value) the phototransistor gives off a higher current. The increased current from the phototransistor is switching an electronic switch for the ground wire from the ignition system to ground thus no spark is generated as would be the case when a mechanical switch is grounding the ignition system.

3. Since it is not desirable to turn off the ignition in the same manner as with a mechanical switch yet another function was included in the circuit which is that the ignition is only turned off if the engine speed exceeds 4000 to 5000 RPM. Normal idle speed for this type of engine is about 2000 to 3000 RPM. This means that the engine can be started and operated at an idle speed, but if the engine speed is increased past the 4000 to 5000 RPM the ignition is turned off. This results in a decreased RPM whereas the ignition is again turned on. In other words a very distinct engine operation is achieved that would not be mistaken for any other types of known failure symptoms.

4. The threshold values for the blocking of the light and for the engine RPM at which it is desirable for the ignition to turn off was adjustable on the prototype. In a commercial application it would be desirable that these threshold values would be fixed. It would also be possible for them to be manually adjustable and/or electronically controlled from other engine functions in more sophisticated control systems.

The invention is not limited to the described embodiments but could be varied within the scope of the patent claims. The skilled man therefore has no problems to realize that the detector could for example be placed in a different place in the fuel system. As an alternative to a LED another light source could be used, for example a laser. It is also conceivable that the system and the method according to the invention could be used in connection with internal combustion engines that are powered by a fuel mixed with lubricant, but where the lubricant is provided directly to the engine from a separate lubricant tank and via a pump system. Primarily the system is developed for small two-cycle engines that among others is used for chain saws, grass trimmers, and cut-off saws but could be utilized in all internal combustion engines that utilize a lubrication mixed fuel. The system and method if further suitable for engines that are spark ignited (S.I.) as well as compression ignited (C.I.), whereas the system can not only be utilized within the framework of an ignition system but also be connected to an injection system, in a way that for example, the injection system is turned off or limited, if a threshold value is underpassed.

What is claimed is:

1. A system for an internal combustion engine (10) designed to be operated with a fuel mixed with a lubricant characterized in that it comprises:
    a detector (16) arranged to detect the presence of a specific additive in the lubricant mixed fuel,
    an electronic module (24) arranged to compare the detected presence of an additive with a given threshold value and designed so that; if the lubricant has not been mixed in the fuel or is mixed into the fuel, in an amount that is lower than an, via the additive against the threshold value correlated, amount, by means of an indicator (30) indicate a lack of lubricant in the fuel and/or with a connection (26) to an ignition system or an injection system (11) for the engine (10) prevent or change the operation of the internal combustion engine if such lack of lubricant is at hand in the fuel.

2. A system according to claim 1, characterized in that said threshold value is adjustable for a correlation against the type of additive and the limits for a mixing ratio between fuel, lubricant and additive.

3. a system according to claim 1 or 2, characterized in that said electronic module (24) via said connection (26) to the ignition system (11) of the internal combustion engine (10), is arranged to limit the speed (RPM) of the engine, preferably to only allow an idle speed, if a lack of lubricant is at hand in the fuel.

4. A system according to claims 1 or 2, characterized in that said additive is an additive that changes, preferably increases, an electric conductivity or capacitance of a mixture of fuel and lubricant whereas said detector (16) is designed to detect the presence of the given additive in the lubricant mixed fuel in terms of electric conductivity or capacitance and whereas said threshold value is a threshold value for conductivity or capacitance.

5. A system according to claim 4, characterized in that said detector (16) comprises two electrodes for the measurement of conductivity and capacitance.

6. A system according to claim 1, characterized in that said additive is an additive that changes an optical property in the mixture of fuel and lubricant, whereas said detector (16) is designed to detect the presence of a given additive in the lubricant mixed fuel in terms of this optical property and whereas said threshold value is a threshold value in terms of this optical property.

7. A system in accordance to claim 6, characterized in that said detector comprises an optical sensor, preferably in the form of a light emitting diode (18) and a phototransistor (20) whereas the said additive is a colorant adapted to absorb light in the wavelength or spectrum of the light emitting diode.

8. A method relating to the operation of an internal combustion engine (10) that is powered by a fuel mixed with a lubricant, characterized in that;
    a presence of a given additive in the lubricant mixed fuel is detected (16)
    The detected presence of the additive is compared (24) with a set threshold value, whereas it, when the lubricant is not mixed in the fuel or has been mixed into the fuel in an amount lower than one through the additive against the threshold value correlated amount, indicates (30) that a lack of lubricant is at hand in the fuel and/or whereas the internal combustion engine operation is prevented or changed if said lack of lubricant is at hand in the fuel.

9. A method according to claim 8, characterized in that said threshold value is adjustable for correlation against the type of additive, and the limits for a mixing ratio between the fuel, lubricant and additive.

10. A method according to claim 8 or 9, characterized in that the RPM of the engine (10) is limited (26) preferably that only the idle speed is allowed, if a lack of lubricant is at hand in the fuel.

11. A method according to claim 8, characterized in that said additive is an additive that modifies, preferably increases, an electric conductivity or capacitance of the mixture of fuel and lubricant whereas the detection (16) of the presence of said additive in the lubricant mixed fuel is measured in terms of electrical conductivity or capacitance and whereas said threshold value is a threshold value in terms of electrical conductivity or capacitance.

12. A method according to claim 8, characterized in that said additive is an additive that changes an optical property of a mixture of fuel and lubricant, whereas the detection (16) of the presence of the said additive in the lubricant mixed fuel is measured in terms of this optical property and whereas said threshold value is a threshold value in terms of this optical property.

* * * * *